(12) United States Patent
Duan

(10) Patent No.: US 6,544,136 B2
(45) Date of Patent: Apr. 8, 2003

(54) DIFFERENTIAL DEVICE

(75) Inventor: Xiaohong Nina Duan, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/908,513

(22) Filed: Jul. 18, 2001

(65) Prior Publication Data

US 2003/0017902 A1 Jan. 23, 2003

(51) Int. Cl.⁷ ............................................... F16H 48/30
(52) U.S. Cl. .............................. 475/88; 475/89; 475/93
(58) Field of Search ............................. 74/650; 475/88, 475/230, 231, 89, 93; 180/248

(56) References Cited

U.S. PATENT DOCUMENTS

| 473,444 A | 4/1892 | Barney | |
|---|---|---|---|
| 1,677,996 A | 7/1928 | Wingquist | |
| 2,175,520 A | 10/1939 | Frederickson | |
| 2,623,619 A | 12/1952 | Clerk | |
| 2,986,024 A | 5/1961 | Power | |
| 3,118,292 A | 1/1964 | Schroter et al. | |
| 3,350,961 A | 11/1967 | Dodge | |
| 3,724,289 A | 4/1973 | Kennicutt | 74/711 |
| 3,831,461 A | 8/1974 | Mueller | 74/711 |
| 4,012,968 A | 3/1977 | Kelbel | 74/711 |
| 4,462,272 A | 7/1984 | Roper | |
| 4,493,227 A | 1/1985 | Schmid | 74/711 |

(List continued on next page.)

FOREIGN PATENT DOCUMENTS

| EP | 0911204 | 4/1999 | |
|---|---|---|---|
| GB | 2 187 824 | 3/1986 | |
| GB | 2252801 | 2/1992 | |
| JP | 401182127 | * 7/1989 | ............... 74/412 R |
| JP | 1261553 | 10/1989 | |
| JP | 200062495 | 2/2000 | |
| JP | 200074096 | 3/2000 | |
| JP | 2001-163079 | 6/2001 | |

OTHER PUBLICATIONS

M. Okcuoglu, "A Descriptive Analysis of Gerodisc Type Limited Slip Differentials and All Wheel Drive Couplings", Society of Automotive Engineers, Inc., Copyright 1995, pp. 15–20.

Primary Examiner—Sherry Estremsky
Assistant Examiner—Tisha D. Lewis
(74) Attorney, Agent, or Firm—Brinks Hofer Gilson & Lione

(57) ABSTRACT

A differential device for transferring torque and rotation from an input shaft to a first output shaft and a second output shaft of a vehicle is provided. The differential device includes a carrier coupled to an input shaft, a first pump/motor coupled to the carrier and to the first output shaft, and a second pump/motor coupled to the carrier and to the second output shaft. The first pump/motor preferably functions to pump a hydraulic fluid upon a rotation of the first output shaft at a different speed than the carrier, and to rotate the first output shaft at a different speed than the carrier upon a sufficient pressurization of the hydraulic fluid. Similarly, the second pump/motor preferably functions to pump a hydraulic fluid upon a rotation of the second output shaft at a different speed than the carrier, and to rotate the second output shaft at a different speed than the carrier upon a sufficient pressurization of the hydraulic fluid.

20 Claims, 2 Drawing Sheets

U.S. PATENT DOCUMENTS

| | | | |
|---|---|---|---|
| 4,633,735 A | | 1/1987 | Sakurai et al. |
| 4,676,336 A | | 6/1987 | Hiramatsu et al. |
| 4,719,817 A | | 1/1988 | Azuma |
| 4,730,514 A | * | 3/1988 | Shikata et al. ............ 192/70.12 |
| 4,779,698 A | * | 10/1988 | Iwata .......................... 180/247 |
| 4,838,118 A | | 6/1989 | Binkley |
| 4,841,809 A | * | 6/1989 | Jolly ........................... 475/163 |
| 4,867,012 A | | 9/1989 | McGarraugh |
| 4,884,653 A | | 12/1989 | Kouno |
| 4,905,808 A | | 3/1990 | Tomita et al. ........... 192/85 AA |
| 4,949,594 A | | 8/1990 | Galhotra |
| 4,960,011 A | | 10/1990 | Asano .......................... 74/650 |
| 4,966,268 A | | 10/1990 | Asano et al. .............. 192/58 C |
| 4,974,471 A | | 12/1990 | McGarraugh |
| 4,987,967 A | | 1/1991 | Kouno |
| 4,995,491 A | | 2/1991 | Hiramatsu et al. ........ 192/58 R |
| 5,007,886 A | | 4/1991 | Holmquist et al. |
| RE33,742 E | | 11/1991 | Blessing et al. |
| 5,092,825 A | | 3/1992 | Goscenski, Jr. et al. |
| 5,172,787 A | * | 12/1992 | Kobayashi .................. 180/197 |
| RE34,209 E | | 3/1993 | McGarraugh ................ 475/88 |
| 5,194,053 A | | 3/1993 | Sano et al. .................... 475/89 |
| 5,201,820 A | * | 4/1993 | Hamada et al. ............. 180/233 |
| 5,415,598 A | * | 5/1995 | Sawase et al. .............. 475/150 |
| 5,445,574 A | | 8/1995 | Sekiguchi et al. |
| 5,456,641 A | * | 10/1995 | Sawase ........................ 180/197 |
| 5,469,950 A | | 11/1995 | Lundström et al. |
| 5,536,215 A | | 7/1996 | Shaffer et al. ................. 475/88 |
| 5,542,316 A | | 8/1996 | Spooner et al. ................ 74/650 |
| 5,690,002 A | | 11/1997 | Showalter ..................... 74/650 |
| 5,735,764 A | | 4/1998 | Shaffer et al. ................. 475/88 |
| 5,827,145 A | | 10/1998 | Okcuoglu ..................... 475/88 |
| 5,888,163 A | | 3/1999 | Shaffer et al. |
| 5,893,812 A | | 4/1999 | Narai et al. |
| 5,915,513 A | | 6/1999 | Isley, Jr. et al. |
| 5,916,052 A | | 6/1999 | Dick |
| 5,938,555 A | | 8/1999 | Leeper ......................... 475/88 |
| 5,938,556 A | | 8/1999 | Lowell |
| 5,941,788 A | | 8/1999 | Shaffer et al. ................. 475/88 |
| 5,964,126 A | | 10/1999 | Okcuoglu |
| 5,979,631 A | | 11/1999 | Lundstrom |
| 5,984,822 A | | 11/1999 | Schreier et al. |
| 6,001,040 A | | 12/1999 | Engle |
| 6,019,694 A | | 2/2000 | Forrest et al. |
| 6,048,286 A | | 4/2000 | Perry |
| 6,095,939 A | | 8/2000 | Burns et al. ................... 475/88 |
| 6,119,061 A | | 9/2000 | Schenkel et al. |
| 6,176,800 B1 | | 1/2001 | Shaffer et al. ................. 475/88 |
| 6,213,241 B1 | | 4/2001 | Kita et al. .................... 180/248 |
| 6,332,522 B1 | | 12/2001 | Morse et al. ............ 192/85 AA |

* cited by examiner

DIFFERENTIAL DEVICE

TECHNICAL FIELD OF THE INVENTION

This invention relates generally to differential devices in the automotive industry and, more specifically, to limited slip differential devices for coupling an input shaft, a first output shaft, and a second output shaft.

BACKGROUND OF THE INVENTION

In front or rear wheel drive vehicles, a front or rear differential is typically used to transfer the torque and motion from the engine and transmission to the left and right half shafts, and to allow the two half shafts to rotate at different speeds, which is fundamental to the vehicle for efficient turns. For all-wheel-drive vehicles, a central differential is typically installed to allow the front and rear shafts to rotate at different speeds, which, again, is fundamental to the vehicle for efficient turns and for stress avoidance. In a vehicle using a conventional central differential, however, if one wheel loses traction, the other wheel loses traction also. The limited slip differential was created to overcome this problem. In a vehicle using a conventional limited slip differential, if one wheel lost traction and begun to rotate much faster than the other wheel, the conventional limited slip differential sensed the situation and restricted the rotation of the wheel. Because increased traction is very important in a vehicle, especially in off-road conditions, there is a need in the automotive industry for continuous improvement of the limited slip differential.

DETAILED DESCRIPTION OF THE PREFERRED EMBODIMENT

The following description of the preferred embodiment of the invention is not intended to limit the scope of the invention to the preferred embodiment, but rather to enable any person skilled in the art of automotive differential devices to make and use the invention.

Figure 1:
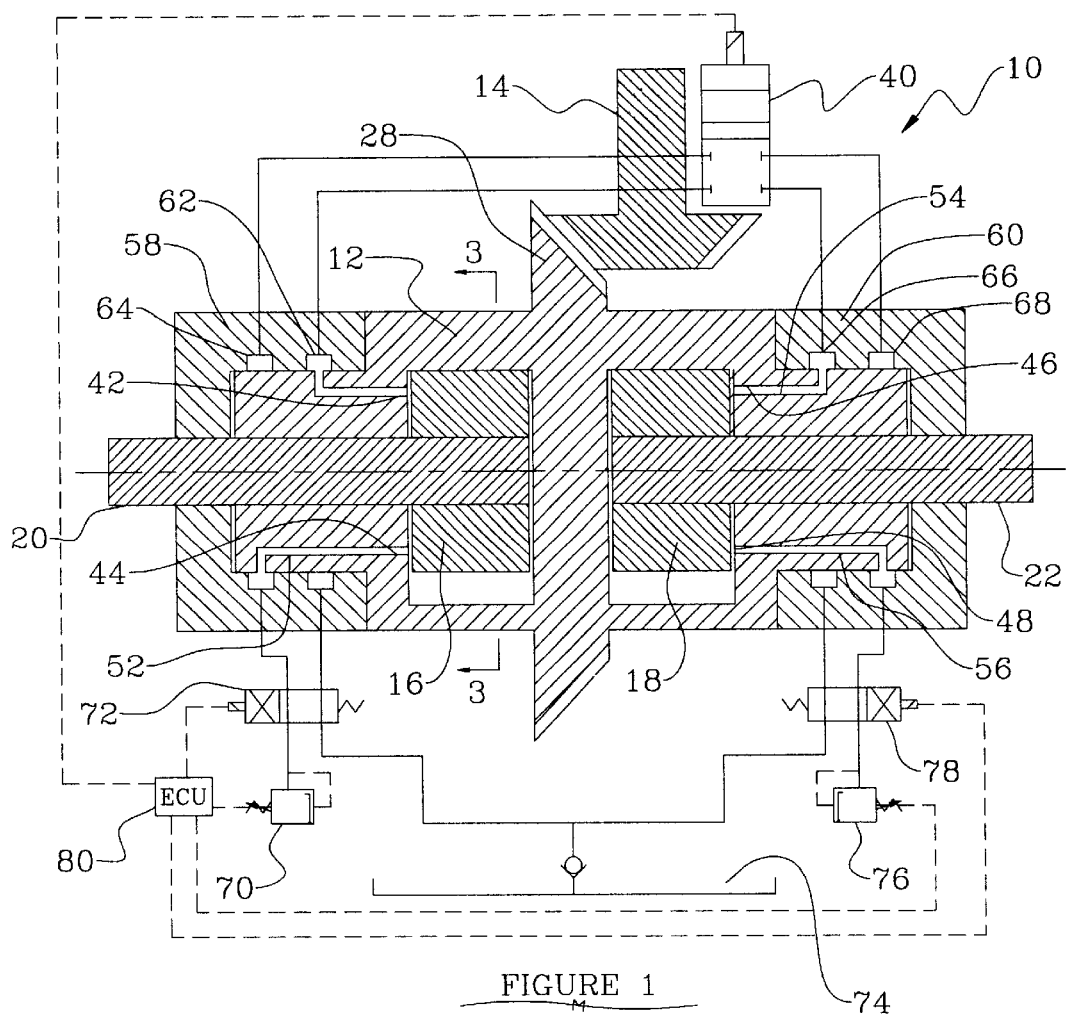
FIG. 1 is cross-sectional view of the device of the preferred embodiment.

As shown in FIG. 1, the limited slip differential device 10 of the preferred embodiment includes a carrier 12 coupled to an input shaft 14, a first pump/motor 16 coupled to the carrier 12 and to a first output shaft 20, and a second pump/motor 18 coupled to the carrier 12 and to a second output shaft 22.

Figure 2:
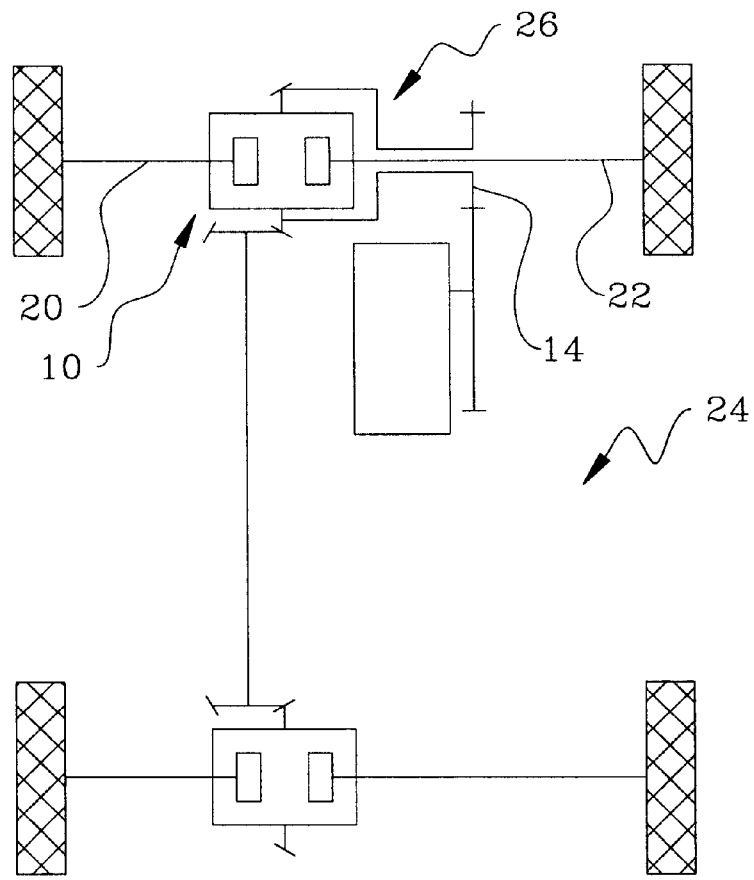
FIG. 2 is a schematic of the device of FIG. 1 arranged within a front-wheel-drive based vehicle with all-wheel-drive capabilities.

As shown in FIG. 2, the limited slip differential device 10 of the preferred embodiment has been specifically designed for transferring torque and rotation from the input shaft 14 to the first front output shaft 20 and the second front output shaft 22 of a front-wheel-drive based vehicle 24 with all-wheel-drive capabilities. In this arrangement, the limited slip differential device 10 of the preferred embodiment is known as a front axle limited slip differential 26. The limited slip differential device 10, however, may be used in other suitable arrangements. As an example, the device may be used for coupling a front drive shaft and a rear drive shaft of a front-wheel-drive based vehicle 24 with all-wheel-drive capabilities, or it may be used to transfer torque and rotation from an input shaft to a first rear output shaft and a second rear output shaft of a front-wheel-drive based vehicle with all-wheel-drive capabilities (known as a rear limited slip differential device).

As shown in FIG. 1, the carrier 12 of the preferred embodiment, which preferably functions to receive torque and rotation from the input shaft 14, preferably includes a ring gear 28, which functions to transfer torque and rotation of the input shaft 14 into rotation of the carrier 12 about a perpendicular axis. The carrier 12, including the ring gear 28, is preferably made with conventional structural materials, such as steel, and from conventional methods, but may alternatively be made with other suitable materials and from other suitable methods.

Figure 3:
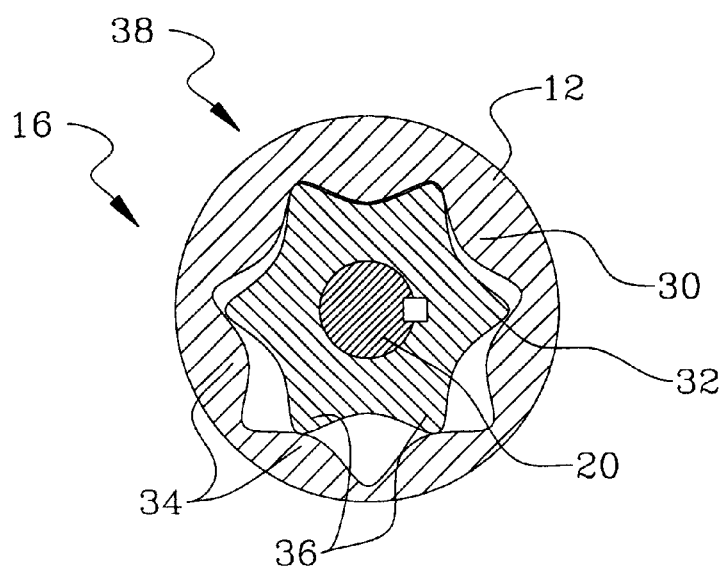
FIG. 3 is a partial cross-sectional view, taken along the line 3—3 of FIG. 1, of one of the pump/motors of the device of FIG. 1.

As shown in FIG. 3, the first pump/motor 16 of the preferred embodiment functions to pump a hydraulic fluid upon a rotation of the first output shaft 20 at a different speed than the carrier 12 and, in this manner, the first pump/motor 16 acts as a hydraulic pump. The first pump/motor 16 also preferably functions to rotate the first output shaft 20 at a different speed than the carrier 12 upon a sufficient pressurization of the hydraulic fluid and, in this manner, the first pump/motor 16 acts as a hydraulic motor. The first pump/motor 16 of the preferred embodiment includes an exterior element 30 coupled to the carrier 12 and an interior element 32 coupled to the first output shaft 20. The exterior element 30 preferably has inward teeth 34, while the interior element 32 preferably has outward teeth 36. In the preferred embodiment, the exterior element 30 preferably has seven inward teeth 34, while the interior element 32 preferably has six outward teeth 36. In alternative embodiments, however, the exterior element 30 may have more or less than seven inward teeth 34, and the interior element 32 may have more or less the six outward teeth 36, as long as the exterior element 30 has more inward teeth 34 than the interior element 32 has outward teeth 36. The inward teeth 34 of the exterior element 30 are preferably shifted relative the rotational axis of the exterior element 30. With this tooth arrangement, the first pump/motor 16 is commonly known as a gerotor pump/motor 38. The first pump/motor 16, however, may include other suitable elements that, either in combination with the above elements or as substitution of the above elements, function to pump a hydraulic fluid upon a rotation of the first output shaft 20 at a different speed than the carrier 12 and to rotate the first output shaft 20 at a different speed than the carrier 12 upon a sufficient pressurization of the hydraulic fluid. As an example, the first pump/motor 16 could alternative be any suitable form of gears, vane, and piston pump/motors. The first pump/motor 16, including the exterior element 30 and the interior element 32, is preferably made from conventional structural materials and with conventional methods, but may alternatively be made from other suitable materials and with other suitable methods.

In the preferred embodiment, the second pump/motor 18 has the identical structure and functions in the identical manner to the first pump/motor 16, except that the second pump/motor 18 interacts with the second output shaft 22. In alternative embodiments, however, the second pump/motor 18 may have a different structure or may function in a different manner than the first pump/motor 16.

As shown in FIG. 1, the limited slip differential of the preferred embodiment also includes a connection valve 40. The connection valve 40 preferably functions to selectively communicate hydraulic fluid between the first pump/motor 16 and the second pump/motor 18. As discussed above, rotation of the first output shaft 20 at a slower speed than the carrier 12 will cause a pressurization of the hydraulic fluid by the pumping action of the first pump/motor 16. Because of the communication between the first pump/motor 16 and the second pump/motor 18, however, this pressurization of the hydraulic fluid will cause the second pump/motor 18 to rotate the second output shaft 22 at a faster speed than the carrier 12. Similarly, rotation of the second output shaft 22 at a slower speed than the carrier 12 will cause a pressurization of the hydraulic fluid by the pumping action of the second pump/motor 18, which will cause the second pump/motor 18 to rotate the first output shaft 20 at a faster speed than the carrier 12. This preferred function of the connection valve 40 is preferably used by the vehicle 24 during turning situations.

During turning situations, the inner wheels (those facing inward toward the center of the turning radius) travel a lesser distance than the outer wheels (those facing outward). Because of the connection between the inner wheels and the outer wheels and because of the difference in the travel distance, the inner wheels rotate at a slower speed than the outer wheels. When using the limited slip differential device 10 during a turning situation, the inner wheels rotate at a slower speed than the carrier 12, which pumps hydraulic fluid. This pressurization of the hydraulic fluid drives the outer wheels at a faster speed than the carrier 12, thereby applying proper torque and rotation to the inner and outer wheels of a vehicle 24 during the turning situation.

The first pump/motor 16 of the preferred embodiment defines a first port 42 and a second port 44. Similarly, the second pump/motor 18 of the preferred embodiment defines a third port 46 and a fourth port 48. The ports 42, 44, 46, and 48, which preferably function to communicate hydraulic fluid into and out of the pump/motors 16 and 18, are preferably located at the points of highest and lowest pressure of the hydraulic fluid during relative rotation of the exterior element 30 and the interior element 32.

The carrier 12 of the preferred embodiment defines a first conduit 50 connected to the first port 42, a second conduit 52 connected to the second port 44, a third conduit 54 connected to the third port 46, and a fourth conduit 56 connected to the fourth port 48. The connection valve 40, which functions to selectively communicate hydraulic fluid between the first pump/motor 16 and the second pump/motor 18, preferably selectively connects the first conduit 50 and the third conduit 54 and preferably selectively connects the second conduit 52 and the fourth conduit 56. In the preferred embodiment, the conduits are defined by the carrier 12. In alternative embodiments, the conduits may be defined by other suitable elements or devices.

In the preferred embodiment, the limited slip differential device 10 also includes a first housing member 58 and a second housing member 60. The housing members function to provide a stationary connection to the conduits, despite any relative rotation of the carrier 12 to the vehicle. For this reason, the first housing member 58 preferably includes a first connector 62 and a second connector 64, both shaped as an annular ring around the carrier 12. The first connector 62 preferably communicates with the first conduit 50, while the second connector 64 preferably communicates with the second conduit 52. Similarly, the second housing member 60 preferably includes a third connector 66 and a fourth connector 68, both shaped as an annular ring around the carrier 12. The third connector 66 preferably communicates with the third conduit 54, while the fourth connector 68 preferably communicates with the fourth conduit 56. In alternative embodiments, other suitable devices or methods may be used to provide a stationary connection to the conduits 50, 52, 54, and 86.

The pump/motors 16 and 18 of the preferred embodiment also preferably function to transfer torque from the carrier 12 to the output shafts 20 and 22. These functions are preferably accomplished in a manner proportional to the pressure of the hydraulic fluid pushing against the pump/motors 16 and 18. As an example, if the hydraulic fluid is highly pressurized against the pump/motor, then the pump/motor will transfer nearly all torque from the carrier 12 to the output shaft. In this manner, the carrier 12 and the output shaft are effectively rotationally engaged to one another. On the other extreme, if the hydraulic fluid is not pressurized, but rather vented away from the pump/motor, then the first pump/motor 16 will transfer nearly no torque from the carrier 12 to the first output shaft 20. In this manner, the carrier 12 and the output shaft almost freely rotate relative to one another. These preferred functions of the pump/motors are preferably used to selectively engage or disengage the wheels of the vehicle 24. If used on a vehicle 24 with front-wheel-drive capabilities, the front wheels or the rear wheels may be engaged to increase vehicle 24 traction, and disengaged to increase fuel economy. These preferred functions, however, might have other suitable uses in the vehicle 24.

In the preferred embodiment, the limited slip differential device 10 also includes a first relief valve 70, which preferably functions to restrict the maximum pressure of the hydraulic fluid against the first pump/motor 16. The first relief valve 70 preferably has controllable properties. In this manner, the maximum pressure of the hydraulic fluid, and thereby the torque transfer of the first pump/motor 16, is controllable. The first relief valve 70 may alternatively have pre-set properties and parameters. Since the first pump/motor 16 may pump hydraulic fluid out of the first port 42 or the second port 44 (depending on the relative directions of the carrier 12 and the first output shaft 20), the first relief valve 70 is preferably coupled to both the first conduit 50 and the second conduit 52. In the preferred embodiment, the limited slip differential device 10 includes a first direction valve 72, which functions to selectively connect the first conduit 50 and the second conduit 52 with the first relief valve 70. Like the first relief valve 70, the first direction valve 72 preferably has controllable properties, but may alternatively have pre-set properties and parameters. In alternative embodiments, other suitable devices or methods may connect the first port 42 and the second port 44 to the first relief valve 70.

In the preferred embodiment, the limited slip differential device 10 also preferably includes a reservoir 74, which functions to supply hydraulic fluid to the pump and contain excess hydraulic fluid. The reservoir 74 is preferably connected to the first direction valve 72 such that the first conduit 50 or the second conduit 52 is connected to the first relief valve 70, while the other is connected to the reservoir 74. The reservoir 74 may alternatively be connected to the first pump/motor 16 with other suitable devices or methods.

In the preferred embodiment, the limited slip differential device 10 also includes a second relief valve 76, which preferably has the identical structure and functions in the identical manner to the first relief valve 70. The second relief valve 76 is preferably coupled to both the third conduit 54 and the fourth conduit 56. In the preferred embodiment, the limited slip differential device 10 includes a second direction valve 78, which functions to selectively connect the third conduit 54 and the fourth conduit 56 with the second relief valve 76. The second direction valve 78 preferably has the identical structure and functions in the identical manner to the first direction valve 72. In the preferred embodiment, the first direction valve 72 and the second direction valve 78 are both couple to the same reservoir 74.

In the preferred embodiment, the limited slip differential device 10 also includes an electric control unit 80, which functions to control the connection valve 40, the connection valve 40, the first direction valve 72, the second direction valve 78, the first relief valve 70, and the second relief valve 76. In alternative embodiments, one or more of the valves 40, 70, 72, 76, and 78 may be controlled by another suitable device or method, or may include pre-set properties and parameters. The electric control unit 80 is preferably made with conventional materials and from conventional methods, but may alternatively be made with other suitable materials and from other suitable methods.

During the preferred operation of the limited slip differential device 10 of the preferred embodiment, an engine, or other device, rotates the input shaft 14. The ring gear 28 of the limited slip differential device 10 transfers the torque and rotation of the input shaft 14 into a rotation of the carrier 12. If the vehicle 24 is in turning situation (as sensed by a suitable sensor), the electric control unit 80 preferably controls the connection valve 40 to communicate hydraulic fluid between the first pump/motor 16 and the second pump/motor 18. During the turning situation, the inner wheels, which rotate at a slower speed than the carrier 12, pump hydraulic fluid. This pressurization of the hydraulic fluid drives the outer wheels at a faster speed than the carrier 12, thereby applying proper torque and rotation to the inner and outer wheels of a vehicle 24 during the turning situation. If the vehicle 24 is in a low traction situation (as sensed by a suitable sensor), the electric control unit 80 preferably controls the connection valve 40 to not communicate hydraulic fluid between the first pump/motor 16 and the second pump/motor 18, and controls the first relief valve 70 and the second relief valve 76 such that the torque of the input shaft 14 is directed to the wheels with the most traction. If, in a third mode, the vehicle 24 is in a situation with a potential of relatively high fuel economy (again, as sensed by a suitable sensor), the electric control unit 80 preferably controls the first relief valve 70 and the second relief valve 76 such that the torque of the input shaft 14 is directed away from some of the wheels (such as the rear wheels). The limited slip differential device 10, of course, may be used in any other suitable manner and situation.

As any person skilled in the art of automotive differential devices will recognize from the previous description and from the figures and claims, modifications and changes can be made to the preferred embodiments of the invention without departing from the scope of the invention defined in the following claims.

I claim:

1. A differential device for transferring torque and rotation from an input shaft to a first output shaft and a second output shaft of a vehicle, comprising:

a carrier coupled to the input shaft and adapted to receive torque and rotation from the input shaft;

a first pump/motor coupled to said carrier and the first output shaft and adapted to pump a hydraulic fluid upon a rotation of the first output shaft at a different speed than said carrier, and to rotate the first output shaft at a different speed than said carrier upon a sufficient pressurization of said hydraulic fluid;

a second pump/motor coupled to said carrier and the second output shaft and adapted to pump a hydraulic fluid upon a rotation of the second output shaft at a different speed than said carrier, and to rotate the second output shaft at a different speed than said carrier upon a sufficient pressurization of said hydraulic fluid; and a connection valve adapted to selectively communicate hydraulic fluid between said first pump/motor and said second pump/motor such that upon the rotation of the first output shaft at a slower speed than said carrier, said second pump/motor rotates the second output shaft at a faster speed than said carrier and adapted to selectively not communicate hydraulic fluid between said first pump/motor and said second pump/motor such that torque directed to said first output shaft and torque directed to said second output shaft are substantially independent.

2. The device of claim 1 wherein said connecting valve is further adapted to selectively communicate hydraulic fluid between said first pump/motor and said second pump/motor such that upon the rotation of the second output shaft at a slower speed than said carrier, said first pump/motor rotates the first output shaft at a faster speed than said carrier.

3. The device of claim 2 wherein said first pump/motor defines a first port and a second port, wherein said carrier defines a first conduit connected to said first port and a second conduit connected to said second port, wherein said second pump/motor defines a third port and a fourth port, and wherein said carrier defines a third conduit connected to said third port and a fourth conduit connected to said fourth port.

4. The device of claim 3 wherein said connecting valve is adapted to selectively communicate hydraulic fluid between said first conduit and said third conduit, and between said second conduit and said fourth conduit.

5. The device of claim 4 further comprising an electronic control unit adapted to control said connecting valve.

6. The device of claim 1 wherein said first pump/motor is further adapted to transfer torque from said carrier to the first output shaft proportional to the pressure of said hydraulic fluid.

7. The device of claim 6 further comprising a first relief valve adapted to restrict the maximum pressure of said hydraulic fluid, thereby controlling the torque transfer of said first pump/motor.

8. The device of claim 7 wherein said first pump/motor defines a first port and a second port, and wherein said carrier defines a first conduit connected to said first port and a second conduit connected to said second port.

9. The device of claim 8 further comprising a first direction valve adapted to selectively connect said first conduit and said second conduit with said first relief valve.

10. The device of claim 9 further comprising a reservoir adapted to contain hydraulic fluid.

11. The device of claim 10 wherein said first direction valve is further adapted to selectively connect said first conduit and said second conduit with said reservoir.

12. The device of claim 11 further comprising an electric control unit adapted to control said first direction valve.

13. A differential device for transferring torque and rotation from an input shaft to a first output shaft and a second output shaft of a vehicle, comprising:

a carrier coupled to the input shaft and adapted to receive torque and rotation from the input shaft;

a first pump/motor coupled to said carrier and the first output shaft and adapted to pump a hydraulic fluid upon a rotation of the first output shaft at a different speed than said carrier, and to rotate the first output shaft at a different speed than said carrier upon a sufficient pressurization of said hydraulic fluid;

a second pump/motor coupled to said carrier and the second output shaft and adapted to pump a hydraulic fluid upon a rotation of the second output shaft at a different speed than said carrier, and to rotate the second output shaft at a different speed than said carrier upon a sufficient pressurization of said hydraulic fluid, wherein said first pump/motor is further adapted to transfer torque from said carrier to the first output shaft proportional to the pressure of said hydraulic fluid, and wherein said second pump/motor is further adapted to transfer torque from said carrier to the second output shaft proportional to the pressure of said hydraulic fluid; and a first relief valve adapted to restrict the pressure of said hydraulic fluid, thereby controlling the torque transfer of said first pump/motor, and a second relief valve adapted to restrict the pressure of said hydraulic fluid, thereby controlling the torque transfer of said second pump/motor.

14. The device of claim 13 wherein said first pump/motor defines a first port and a second port, wherein said carrier defines a first conduit connected to said first port and a second conduit connected to said second port, wherein said second pump/motor defines a third port and a fourth port, and wherein said carrier defines a third conduit connected to said third port and a fourth conduit connected to said fourth port.

15. The device of claim 14 further comprising a first direction valve adapted to selectively connect said first conduit and said second conduit with said first relief valve, and a second direction valve adapted to selectively connect said third conduit and said fourth conduit with said second relief valve.

16. The device of claim 15 further comprising a reservoir adapted to contain hydraulic fluid.

17. The device of claim 16 wherein said first direction valve is further adapted to selectively connect said first conduit and said second conduit with said reservoir, and wherein said second direction valve is further adapted to selectively connect said third conduit and said fourth conduit with said reservoir.

18. The device of claim 17 further comprising an electric control unit adapted to control said first direction valve and said second direction valve.

19. A differential device for transferring torque and rotation from an input shaft to a first output shaft and a second output shaft of a vehicle, comprising:

a carrier coupled to the input shaft and adapted to receive torque and rotation from the input shaft;

a first pump/motor coupled to said carrier and the first output shaft and adapted to pump a hydraulic fluid upon a rotation of the first output shaft at a different speed than said carrier, and to rotate the first output shaft at a different speed than said carrier upon a sufficient pressurization of said hydraulic fluid a second pump/motor coupled to said carrier and the second output shaft and adapted to pump a hydraulic fluid upon a rotation of the second output shaft at a different speed than said carrier, and to rotate the second output shaft at a different speed than said carrier upon a sufficient pressurization of said hydraulic fluid;

a connection valve adapted to selectively communicate hydraulic fluid between said first pump/motor and said second pump/motor such that upon the rotation of the first output shaft a different speed than said carrier, said second pump/motor rotates the second output shaft at a different speed than said carrier, and such that upon the rotation of the second output shaft at a different speed than said carrier, said first pump/motor rotates the first output at a different speed than said carrier, said connected valve also being adapted to selectively not communicate hydraulic fluid between said first pump/motor and said second pump/motor such that torque directed to said first output shaft and torque directed to said second output shaft are substantially independent; and wherein said first pump/motor is further adapted to transfer torque from said carrier to the first output shaft proportional to the pressure of said hydraulic fluid, and said second pump/motor is further adapted to transfer torque from said carrier to the second output shaft proportional to the pressure of said hydraulic fluid.

20. The device of claim 19 further comprising a first relief valve adapted to restrict the pressure of said hydraulic fluid, thereby controlling the torque transfer of said first pump/motor, and a second relief valve adapted to restrict the pressure of said hydraulic fluid, thereby controlling the torque transfer of said second pump/motor.

* * * * *

UNITED STATES PATENT AND TRADEMARK OFFICE
CERTIFICATE OF CORRECTION

PATENT NO. : 6,544,136 B2
DATED : April 8, 2003
INVENTOR(S) : Xiaohong N. Duan

It is certified that error appears in the above-identified patent and that said Letters Patent is hereby corrected as shown below:

<u>Column 8,</u>
Line 11, immediately after "fluid" insert -- ; -- (semicolon), and begin a new paragraph starting with the words "a second pump/motor".

Signed and Sealed this

Thirtieth Day of September, 2003

JAMES E. ROGAN
*Director of the United States Patent and Trademark Office*